United States Patent [19]

Schultz

[11] Patent Number: 5,054,977
[45] Date of Patent: Oct. 8, 1991

[54] SELF PLUGGING BLIND RIVET

[75] Inventor: Max Schultz, Killingworth, Conn.

[73] Assignee: Automatic Fastener Corporation, Branford, Conn.

[21] Appl. No.: 584,117

[22] Filed: Sep. 18, 1990

[51] Int. Cl.⁵ ........................ F16B 13/04; F16B 13/06
[52] U.S. Cl. ........................ 411/43; 411/48; 411/69
[58] Field of Search ................ 411/34–38, 411/43, 45, 46, 48, 69, 70

[56] References Cited

U.S. PATENT DOCUMENTS

| | | | |
|---|---|---|---|
| 3,047,181 | 7/1962 | Heidenwolf | 411/70 |
| 3,149,530 | 9/1964 | Kolec | 411/70 |
| 3,377,907 | 4/1968 | Hurd | 411/70 |
| 3,515,028 | 6/1970 | Patton | 411/70 |
| 4,211,145 | 7/1980 | Dolch . | |
| 4,318,650 | 3/1982 | LLauge . | |
| 4,367,994 | 1/1983 | Francis et al. . | |
| 4,639,174 | 1/1987 | Denham et al. . | |
| 4,897,003 | 1/1990 | Bradley et al. . | |
| 4,897,004 | 1/1990 | Norton . | |

FOREIGN PATENT DOCUMENTS

| | | | |
|---|---|---|---|
| 856808 | 12/1960 | United Kingdom | 411/43 |
| 86/04965 | 8/1986 | World Int. Prop. O. | 411/43 |

Primary Examiner—Neill R. Wilson
Attorney, Agent, or Firm—Larson and Taylor

[57] ABSTRACT

A structural splitting self plugging pull mandrel blind rivet includes a tubular rivet body and a T-mandrel disposed therein. A locking plug is provided on the T-mandrel and includes a locking section having a plurality of locking rings and a shoulder including a secondary locking mechanism. The secondary locking mechanism preferably includes a peripheral groove in the shoulder with a peripheral lip protruding above the shoulder at each longitudinal side of the groove. The peripheral lip adjacent the mandrel head protrudes further than the peripheral lip adjacent the locking section, with the secondary locking mechanism forming a fish-hook profile. The peripheral lips are also bevelled toward the mandrel head and the locking rings in the locking section are circular and spaced from one another.

10 Claims, 2 Drawing Sheets

SELF PLUGGING BLIND RIVET

FIELD OF THE INVENTION

The present invention relates generally to structural splitting self plugging pull mandrel blind rivets, and more particularly to such a blind rivet including primary and secondary locking mechanisms to lock the T-mandrel in the rivet body.

BACKGROUND OF THE INVENTION

Structural splitting self plugging pull mandrel blind rivets are designed so that the portion of the T-mandrel which breaks off from the portion held by the riveting tool remains in the tubular rivet body. This is typically accomplished by use of a suitably shaped nosepiece for the rivet tool which engages the head of the tubular rivet body and pushes material around locking rings provided on the T-mandrel adjacent the head of the tubular rivet body. However, if non "fishmouth" shaped nosepieces are used on the T rivet tool or an otherwise improper or worn nosepiece is used, the head of the tubular rivet body is not suitably deformed into the locking rings of the T-mandrel and the T-mandrel subsequently comes free of the tubular rivet body. When this occurs in an automobile body, undesirable rattling caused by the T-mandrel typically results. It should also be appreciated that a failure to properly lock the head of the rivet body to the T-mandrel can also occur when warped materials are fastened, by inattention of the operator to proper installation techniques, and by using rivets assembled at less than or greater than the specified grip range.

Disclosed in U.S. Pat. No. 4,639,174 (Denham et al) is a self plugging blind rivet which includes a progressive reduction in diameter of the plug portion of the mandrel in the direction of the mandrel head. Due to the folding and compressing of the rivet body material at the blind side of the rivet hole, an outward circumferential bulge is provided. The folded material enters into a groove formed by an abrupt reduction in diameter of the plug portion of the mandrel stem. Thus, a secondary locking groove is provided, but it is located outside of the material being fastened and thus requires extra clearance. In addition, such a rivet is complicated and thus difficult and expensive to make.

In U.S. Pat. No. 4,211,145 (Dolch), a blind rivet fabricated out of thermoplastic material and having a sealing ring spaced from the set head is disclosed. The sealing ring has a diameter larger than the tubular rivet and is spaced from the head so as to be disposed within the through holes of the coupled parts and thus to be wedged in place.

Other blind rivets having various locking means of general interest are disclosed in the following U.S. patents: U.S. Pat. No. 4,897,004 (Norton); U.S. Pat. No. 4,897,003 (Bradley et al); U.S. Pat. No. 4,367,994 (Francis et al); and U.S. Pat. No. 4,318,650 (Llauge).

SUMMARY OF THE INVENTION

In accordance with the present invention, a structural splitting self plugging pull mandrel blind rivet comprises a tubular rivet body and a T-mandrel received in the rivet body. The rivet body includes an elongate shank, a rivet head at one end and a straight internal bore through the rivet body. The T-mandrel includes a mandrel head at one end and a pull tail at the other which is received in the bore of the rivet body and which extends out beyond the rivet head. A breakneck groove is provided adjacent the pull tail and a locking plug is provided between the mandrel head and the breakneck groove. The locking plug is retained in the rivet body when set and has a locking section adjacent the breakneck groove including a plurality of locking rings thereabout. The locking plug also includes a shoulder adjacent the mandrel head having a diameter greater than the locking rings. A secondary locking means is provided on the shoulder for engaging and locking with the elongate shank when the rivet body is set. The T-mandrel also includes a mandrel head provided at an end of the shoulder away from the breakneck groove.

In a preferred embodiment of the present invention, the secondary locking means includes a peripheral groove in the shoulder and peripheral lips protruding above the shoulder at each longitudinal side of the peripheral groove. The peripheral lip adjacent the mandrel head protrudes further than the peripheral lip adjacent the locking section.

In the preferred embodiment, the longitudinal cross section of the groove and lips forms a fish hook profile. In addition, each of the plurality of locking rings is circular and spaced from the others.

It is an advantage of the present invention that by use of the secondary locking means of the present invention, a mechanism is provided for retaining the T-mandrel in the rivet body even when the locking section of the locking plug is not properly engaged.

It is also an advantage of the present invention that the T-mandrel provided with the secondary locking means is simply and easily provided and makes use of a standard tubular rivet body and rivet tool for setting or joining the tubular rivet body to the T-mandrel.

Other features and advantages of the present invention are stated in or apparent from a detailed description of a presently preferred embodiment of the invention found hereinbelow.

DETAILED DESCRIPTION OF THE PREFERRED EMBODIMENT

Figure 1B:
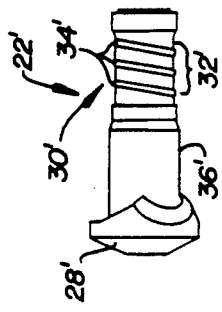
FIGS. 1a and 1b are, respectively, an elevation view of a T-mandrel of the present invention and of the prior art.
Figure 2B:
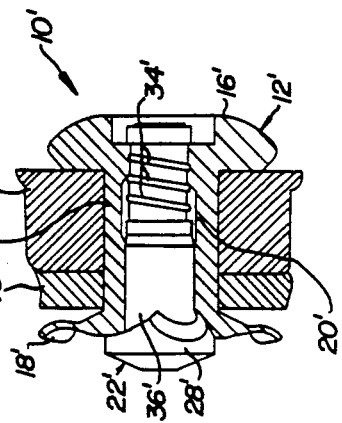
FIGS. 2a and 2b are, respectively, a cross-sectional elevation view of a normally set rivet of the present invention and of the prior art.
Figure 2A:
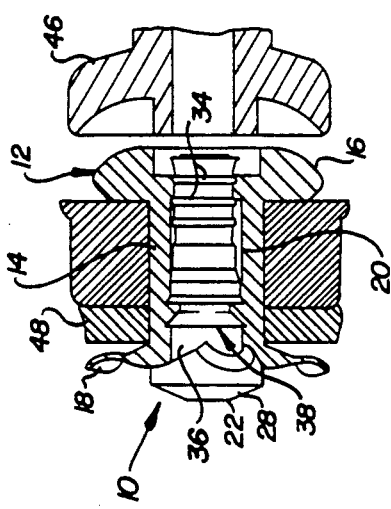
Figure 3B:
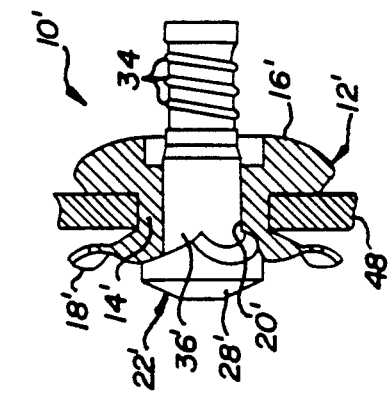
FIGS. 3a and 3b are, respectively, a cross-sectional elevation view of a rivet set below the minimum grip range of the present invention and of the prior art.
Figure 4B:
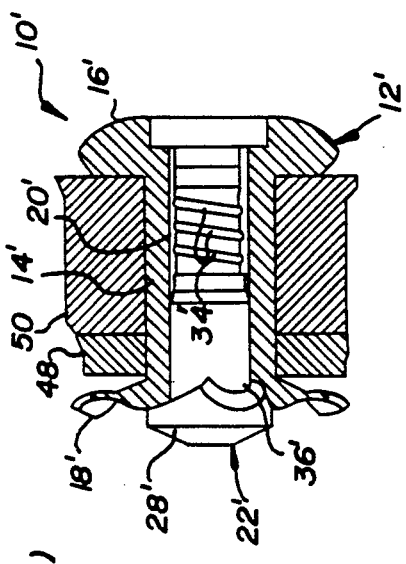
FIGS. 4a and 4b are, respectively, a cross-sectional elevation view of a rivet set above the maximum grip range of the present invention and of the prior art.
Figure 3A:
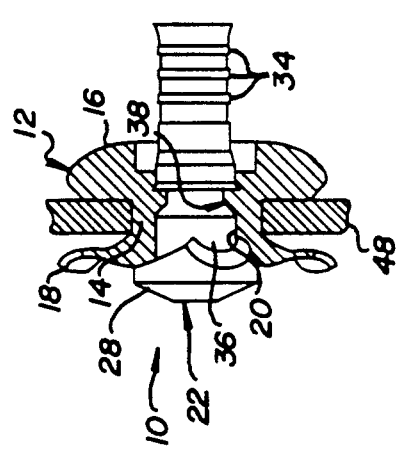
Figure 4A:
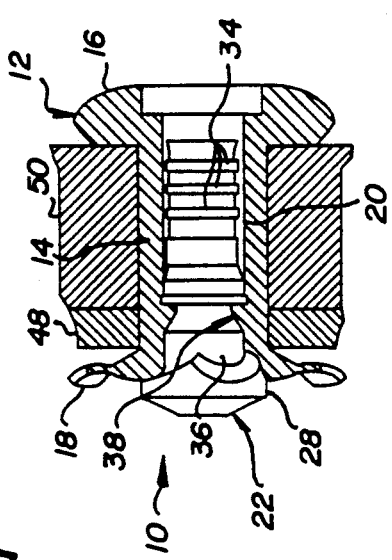

With reference now to the drawings in which like numerals represent like elements throughout the views, a structural splitting self plugging pull mandrel blind rivet 10 of the present invention is depicted in FIGS. 2a, 3a, and 4a. It should be appreciated that blind rivet 10 is to be compared with a structural splitting self plugging pull mandrel blind rivet 10' known in the prior art and depicted in FIGS. 2b, 3b, and 4b. For convenience, the similar elements of blind rivet 10' will be identified with the same reference numeral as those used for blind rivet 10, but with the addition of a "'".

Blind rivet 10 includes a tubular rivet body 12 having an elongate shank 14, a tail end 18, a rivet head 16 provided at the longitudinal end of elongate shank 14 opposite tail end 18, and a straight internal bore 20 provided along the length of rivet body 12. It should be appreciated that rivet body 12 is depicted in FIGS. 2a, 3a, and 4a in the form where blind rivet 10 has been set. Thus, rivet body 12 includes a rivet head 16 which has been deformed and an elongate shank 14 which has been peeled and bent outwards as shown.

Figure 1A:
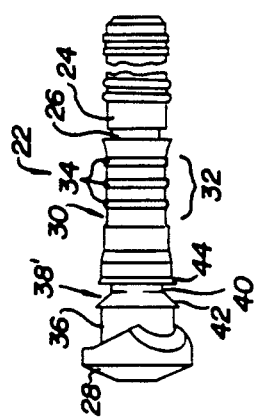

Blind rivet 10 also includes a T-mandrel 22 which is shown in greater detail in FIG. 1a. T-mandrel 22 includes a pull tail 24 which is received in internal bore 20 of rivet body 12. As appreciated by those of ordinary skill in the art, pull tail 24 extends out beyond rivet head 16 prior to the setting of blind rivet 10. T-mandrel 22 also includes a breakneck groove 26 adjacent pull tail 24 which is designed to be located along the length of T-mandrel 22 at a position adjacent rivet head 16 when blind rivet 10 is set. A mandrel head 28 is provided at the end of T-mandrel 22 opposite pull tail 24.

T-mandrel 22 further includes a locking plug 30 which is located between breakneck groove 26 and mandrel head 28. As also appreciated by those of ordinary skill in the art, locking plug 30 is designed to be retained in rivet body 12 after blind rivet 10 has been set. Locking plug 30 includes a locking section 32 which is adjacent breakneck groove 26. Locking section 32 includes a plurality of locking rings 34 which are circular and spaced from one another as shown. Locking section 32 terminates at breakneck groove 26 with an outstanding circular angled skirt 34a as shown. Between locking rings 34 and mandrel head 28 is a shoulder 36 which has a diameter which is slightly greater than that of locking rings 34 and which is slidably received in internal bore 20 of rivet body 12.

In the description of blind rivet 10 above, blind rivet 10 is substantially similar to blind rivet 10' of the prior art, with the exception of locking rings 34. Locking rings 34' of T-mandrel 22' are spiral-shaped, rather than being circular shaped and spaced from one another as with locking rings 34.

The primary difference between T-mandrel 22 and T-mandrel 22' is the presence of a secondary locking means 38 on shoulder 36 of T-mandrel 22. Secondary locking means 38 is used for engaging and locking with elongate shank 14 of rivet body 12 when blind rivet 10 is set. As shown, secondary locking means 38 includes a peripheral groove 40 provided in shoulder 36, and peripheral lips 42 and 44 on respective sides of groove 40 which protrude above the level of shoulder 36. It should be appreciated that lip 42 protrudes further from shoulder 36 than lip 44 and that both lips 42 and 44 are beveled or angled toward mandrel head 28. With this configuration, the cross-sectional profile of secondary locking means is a "fish hook" or a leaning "J" shape.

In the setting of blind rivets 10 or 10', a usual rivet tool having a suitable T-rivet nosepiece 46 is used. With respect to FIG. 2a, it will be appreciated that blind rivet 10 is set by pulling pull tail 24 with the rivet tool while nosepiece 46 engages rivet head 16 of rivet body 12. This causes mandrel head 28 to be withdrawn into tail end 18 of elongate shank 14 resulting in elongate shank 14 being split or peeled as shown. Mandrel head 28 advances along internal bore 20 of peeling elongate shank 14 until it is adjacent a layer 48 of the material to be set. As the rivet tool pulls T-mandrel 22, the resistance of the mandrel head against layers 48 and 50 reaches the mandrel break load which causes a tensile failure at breakneck groove 26. As appreciated by those of ordinary skill in the art, as this occurs nosepiece 46 cold forms the "soft" body material of rivet head 16 into the closest locking rings 34.

As shown in FIG. 2b, blind rivet 10' is similarly locked in place by the cold forming of a portion of mandrel head 16' into the adjacent locking rings 34' Where a proper nosepiece 46 is used and the thickness of layers 48 and 50 are within the proper range (so that locking rings 34' are engaged by the cold forming of mandrel head 28'), a satisfactory setting of blind rivet 10' is achieved. In particular, layers 48 and 50 are securely held together by the deformation of river body 12' and T-mandrel 22' is securely held in rivet body 12' by the cold forming of rivet head 16' into locking rings 34'.

As also appreciated by those of ordinary skill in the art, sometimes an improper nosepiece such as a flat nosepiece is used to set blind rivet 10', or the material is excessively bowed so that cold forming does not properly proceed. In such situations, locking rings 34' are not properly engaged by the cold forming of rivet head 16', so that T-mandrel 22' may come lose from rivet body 12'.

In order to prevent this separation, blind rivet 10 of the present invention is utilized as depicted in FIG. 2a. In FIG. 2a, it will be appreciated that blind rivet 10 has been set in the same manner as blind rivet 10' in FIG. 2b. In the case of a proper setting as depicted in FIG. 2a, rivet head 16 is similarly cold formed into locking rings 34 to hold T-mandrel 22 in place. However, in addition to this engagement, secondary locking means 38 also serves to lock T-mandrel 22 to elongate shank 14 of river body 12. Thus, it will be appreciated that as T-mandrel 22 is pulled into rivet body 12, a cold forming of a portion of elongate shank 14 also occurs in peripheral groove 40 and about lips 42 and 44. Thus, even in situations where locking rings 34 are not properly engaged due to one of the problems mentioned above, secondary locking means 38 still functions to maintain T-mandrel 22 in rivet body 12.

Depicted in FIGS. 3a and 3b are respective blind rivets 10 and 10' which have been set in a layer 48 which is less than the specified grip range. With respect to blind rivet 10' depicted in FIG. 3b, it will be appreciated that no cold forming of rivet head 16 occurs into locking rings 34' because locking rings 34' are spaced away from rivet head 16'. While some frictional force will be exerted against shoulder 36' by the setting of blind rivet 10', it will be appreciated that T-mandrel 22' can still become separated when even a slight axial pressure is exerted thereon, or that vibrations and road bumps might similarly cause such a separation. However, in the same situation depicted in FIG. 3a with respect to blind rivet 10, it will be appreciated that secondary locking means 38 has still functioned as a suitable mechanism for retaining T-mandrel 22 in rivet body 12.

Depicted in FIG. 4b is another improper setting of blind rivet 10', in this case locking rings 34' are located inside of rivet body 12' away from rivet head 16'. Thus, the cold forming of rivet head 16' does not engage locking rings 34', but rather is made into an open space. In this situation, there is very little friction force holding T-mandrel 22' in rivet body 12'.

In FIG. 4a, blind rivet 10 is similarly set as blind rivet 10' in FIG. 4b. In particular, the cold forming of rivet head 16 does not engage any locking rings 34. However, as in FIG. 3a, secondary locking means 38 has provided a cavity for the "soft" material of rivet body 12 to flow into. Thus, T-mandrel 22 is locked into place in rivet body 12 by engagement of elongate shank 14 with lips 42 and 44 and with groove 40.

While the present invention has been described with respect to an exemplary embodiment thereof, it will be appreciated by those of ordinary skill in the art that variations and modifications can be effected within the scope and spirit of the invention.

I claim:

1. A structural self plugging pull mandrel blind rivet comprising:
   a tubular rivet body including an elongate shank, a rivet head provided at one longitudinal end of said elongate shank opposite a tail end of said elongate shank and a straight internal bore provided through said elongate shank and said rivet head; and
   a T-mandrel including a mandrel head at one end, a pull tail at an end opposite said mandrel head which is received in said bore and which extends out beyond said rivet head, a breakneck groove adjacent said pull gail, and a locking plug provided between said mandrel head and said breakneck groove which is retained in said rivet body when set, said locking plug having (a) a locking section adjacent said breakneck groove and including a plurality of locking rings thereabout and (b) a shoulder adjacent said mandrel head having a diameter greater than said locking rings and including discrete secondary locking means protruding beyond a remainder of said shoulder for engaging and locking with said elongate shank when said rivet body is set.

2. A blind rivet as claimed in claim 1 wherein said secondary locking means includes a peripheral groove in said shoulder and a respective peripheral lip protruding above said shoulder at each longitudinal side of said peripheral groove.

3. A blind rivet as claimed in claim 2 wherein said peripheral lip adjacent said mandrel head protrudes further than said peripheral lip adjacent said locking section.

4. A blind rivet as claimed in claim 3 wherein a longitudinal cross section of said groove and said lips forms a fishhook profile of said groove and lips.

5. A blind rivet as claimed in claim 3 wherein said peripheral lips are bevelled toward said mandrel head.

6. A blind rivet as claimed in claim 2 wherein said peripheral lips are bevelled toward said mandrel head.

7. A blind rivet as claimed in claim 1 wherein each of said plurality of locking rings is circular and spaced from the others, and wherein said locking section terminates at said breakneck groove with an outstanding circular skirt.

8. A self plugging pull mandrel blind rivet comprising:
   a tubular rivet body including an elongate shank, a rivet head provided at one longitudinal end of said elongate shank opposite a tail end of said elongate shank and a straight internal bore provided through said elongate shank and said rivet head; and
   a generally cylindrical mandrel including a mandrel head at one end, a pull tail at an end opposite said mandrel head which is received in said bore and which extends out beyond said rivet head, and a locking plug provided between said mandrel head and said pull tail which is retained in said rivet body when the blind rivet is set, said locking plug having (a) a locking section adjacent said pull tail and including a plurality of locking rings thereabout and (b) a shoulder adjacent said mandrel head having a diameter greater than said locking rings and including a secondary locking means for engaging and locking with said elongate shank when said rivet body is set, said secondary locking means including a peripheral groove in said shoulder and a respective peripheral lip protruding above said shoulder at each longitudinal side of said peripheral groove.

9. A blind rivet as claimed in claim 8 wherein said peripheral lip adjacent said mandrel head protrudes further than said peripheral lip adjacent said locking section.

10. A blind rivet as claimed in claim 9 wherein said peripheral lips are bevelled toward said mandrel head.

* * * * *